United States Patent [19]

Krantz

[11] Patent Number: 5,396,478
[45] Date of Patent: Mar. 7, 1995

[54] OPTICAL DATA STORAGE SYSTEM WITH ABERRATION COMPENSATION FOR REDUCED SERVO CROSSTALK

[75] Inventor: Matthias C. Krantz, San Jose, Calif.

[73] Assignee: International Business Machines Corporation, Armonk, N.Y.

[21] Appl. No.: 138,551

[22] Filed: Oct. 15, 1993

Related U.S. Application Data

[63] Continuation of Ser. No. 787,301, Oct. 29, 1991, abandoned.

[51] Int. Cl.⁶ .................................. G11B 7/13
[52] U.S. Cl. ......................... 369/44.41; 369/44.12; 369/44.32; 369/112; 369/120
[58] Field of Search ............... 369/44.41, 44.42, 44.28, 369/44.32, 44.11, 44.12, 44.23, 112, 120, 118

[56] References Cited

U.S. PATENT DOCUMENTS

| | | | |
|---|---|---|---|
| 5,001,334 | 3/1991 | Ikeda | 369/44.41 |
| 5,097,455 | 3/1992 | Marshall | 369/44.41 |
| 5,105,411 | 4/1992 | Ishika | 369/44.41 |
| 5,113,386 | 5/1992 | Whitehead et al. | 369/44.41 |

FOREIGN PATENT DOCUMENTS

| | | | |
|---|---|---|---|
| 60-226030A | 11/1985 | Japan | 369/44.41 |
| 62-146439 | 6/1987 | Japan . | |
| 63-70932A | 3/1988 | Japan | 369/44.41 |
| 63-157326 | 6/1988 | Japan . | |
| 0189043 | 4/1989 | Japan . | |

OTHER PUBLICATIONS

"Optical Servo Crosstalk", I. Prikryl, Optical Society of America, Technical Digest Series, Optical Data Storage, vol. 1, Jan., 1989.

*Primary Examiner*—W. R. Young
*Assistant Examiner*—Muhammad N. Edun
*Attorney, Agent, or Firm*—Douglas R. Millett

[57] ABSTRACT

An optical data storage system comprises a laser for generating a beam of light, an optical data storage media, transmission optics for directing the beam of light to the optical medium, reception optics for receiving a reflected beam from the medium, and circuits for generating a data, tracking error and focus error signals. The reception optics includes a segmented detector. The signals from at least two of these segments are differentially adjusted such that the resulting output focus error signal is approximately independent of nonfocus wavefront aberrations.

32 Claims, 6 Drawing Sheets

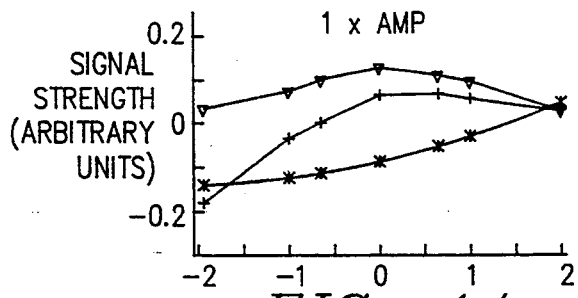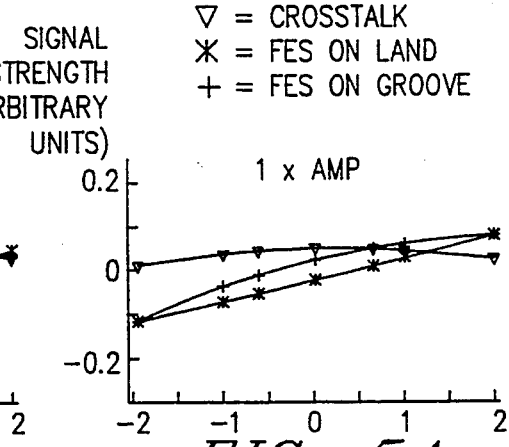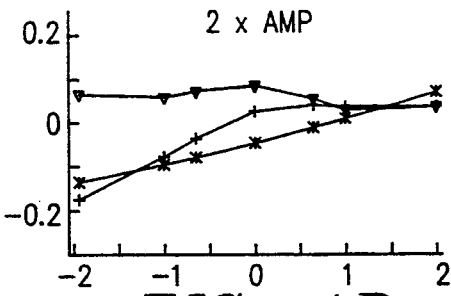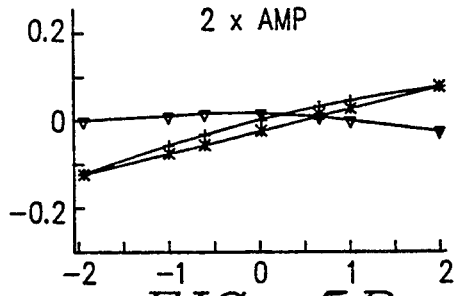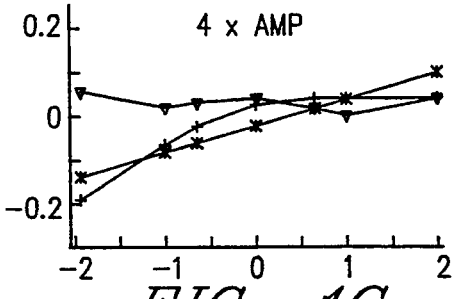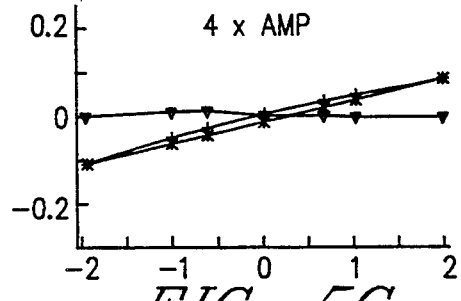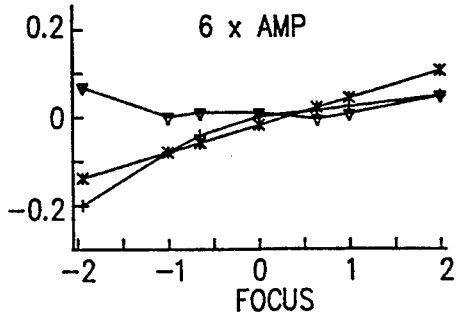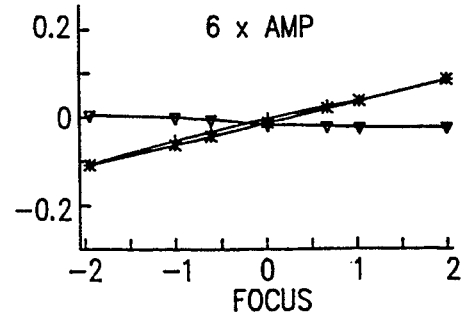

OPTICAL DATA STORAGE SYSTEM WITH ABERRATION COMPENSATION FOR REDUCED SERVO CROSSTALK

This application is a continuation of application Ser. No. 07/787,301, filed Oct. 29, 1991, now abandoned.

BACKGROUND OF THE INVENTION

1. Field of the Invention

This invention relates generally to optical data storage systems and more particularly to a disk storage system and a method for reducing the servo crosstalk between the focus and tracking error signals.

2. Description of the Prior Art

Optical data storage systems provide a means for storing great quantities of data on a disk storage medium. The data is accessed by focusing a laser beam onto the disk and then detecting the information encoded in the reflected light beam. Various kinds of optical systems are known including read only memory (ROM), write once read many (WORM) and erasable. The erasable systems include magneto-optic (MO) and phase change recording media.

The data is typically stored on the optical disk in concentric or spiral data tracks. The laser must maintain focus on the disk while at the same time following the data tracks on the rotating disk. The focus is maintained by moving an objective lens relative to the disk with a focus actuator. The tracking position is adjusted by moving the position of the optical head in a radial direction with a linear actuator. The optical head typically contains the focus lens, focus actuator and beam bender mirror. Various focus and tracking servo schemes are known in the art.

One of the most widely used track servo schemes uses tracking grooves. The data track regions are also referred to as lands. The tracking grooves are molded into the disk on either side of each data track. Grooves may be V-shaped or trapezoidal shaped. The focussed beam has a Gaussian diameter comparable to the land width and is focussed to the groove-land structure of the disk. Diffraction produces different intensity distributions between the zero and plus or minus first diffraction orders depending upon the radial position of the beam spot with respect to the grooves. Generally more intensity is diffracted into the first orders as the beam moves away from the land section and toward the groove section. These light intensity distributions are imaged onto a servo optical detector and used to generate a tracking error signal (TES) which in turn controls the linear actuator to move the optical head in order to keep the beam on track. The same optical detector is commonly also used to generate the focus error signal (FES) as well as the TES. The FES is used to control the focus actuator to maintain the light beam in focus on the disk.

A problem develops when the optical head is moved radially across the disk to seek different tracks. The diffraction of light at the grooves causes wavefront aberrations in the reflected light which results in distortions of the FES. This can cause the light beam to go completely out of focus during the seek operation and may result in disk drive losing track of the position of the optical head, i.e. reduced seek reliability. This phenomenon is referred to as optical servo crosstalk of the TES into the FES and is discussed in the article by I. Prikryl, "Optical Servo Crosstalk," Optical Society of America, Technical Digest Series, Optical Data Storage, Vol. 1, January 1989.

Prior art inventions have sought to solve this problem. These include Japanese patent applications JP 01-89043, published Apr. 3, 1989; JP 63-157326, published Jun. 30, 1988; and JP 62-146439, published Jun. 30, 1987. Each of these systems require rather complex circuitry and/or optical components to obtain a slight reduction in servo crosstalk. What is needed is a simple and more practical solution.

SUMMARY OF THE INVENTION

In a preferred embodiment of the invention, an optical data storage system comprises a laser for generating a first beam of light, an optical data storage medium, transmission optics for directing the first light beam to the medium, reception optics for receiving a second light beam from the medium, and servo circuitry. The reception optics includes a segmented optical detector. The servo circuitry generates a TES, FES and data signals. The optical detector is segmented and the signals from at least two of the segments are differentially adjusted such that the resulting FES is approximately independent of changes in the TES. The result is that the optical system will maintain correct focus even when the optical head is moving across tracks. For a more complete understanding of the nature and advantages of the present invention reference should be made to the following detailed description taken in conjunction with the accompanying drawings.

BRIEF DESCRIPTION OF THE DRAWINGS

FIG. 4A–4D shows graphs of FES and servo crosstalk versus focus position with four different levels of amplification of the present invention for a V-shaped groove medium;

FIGS. 5A–5D show graphs of FES and servo crosstalk versus focus position with four different levels of amplification for the present invention for a trapezoidal shaped groove medium;

DETAILED DESCRIPTION OF THE PREFERRED EMBODIMENTS

Optical servo crosstalk is caused by diffraction of light by the land-groove structure. Wavefront aberrations of the optical field present in the incident beam or produced by diffraction at the disk result in widely varying intensity patterns falling on the servo optical detector. Some of these aberrations vary as a function of focus position and other aberrations vary as a function of track position. Independence of the effects of these aberrations on the servo signal, referred to as orthogonality, is essential for seek reliability. Wavefront aberrations inherent in the optical system or produced by misalignment of the optical components prevent orthogonal focus and track error signals, producing FES/TES crosstalk.

In the present invention a FES is generated which is orthogonal with respect to the presence of these aberrations. This is accomplished by means of properly segmenting the optical detector, selectively amplifying certain of these segments and then generating the FES. In the present case, that means that the FES will be independent of the range of wavefront aberrations produced by the groove structure which occur as the beam crosses the grooves. The FES will be consistent and focus maintained properly no matter what the track position. In addition, crosstalk produced by spherical aberration, astigmatism, and coma, present in the incident wavefront on the disk as the result of misalignment or component tolerances is greatly reduced using the same detector geometry.

Figure 1:
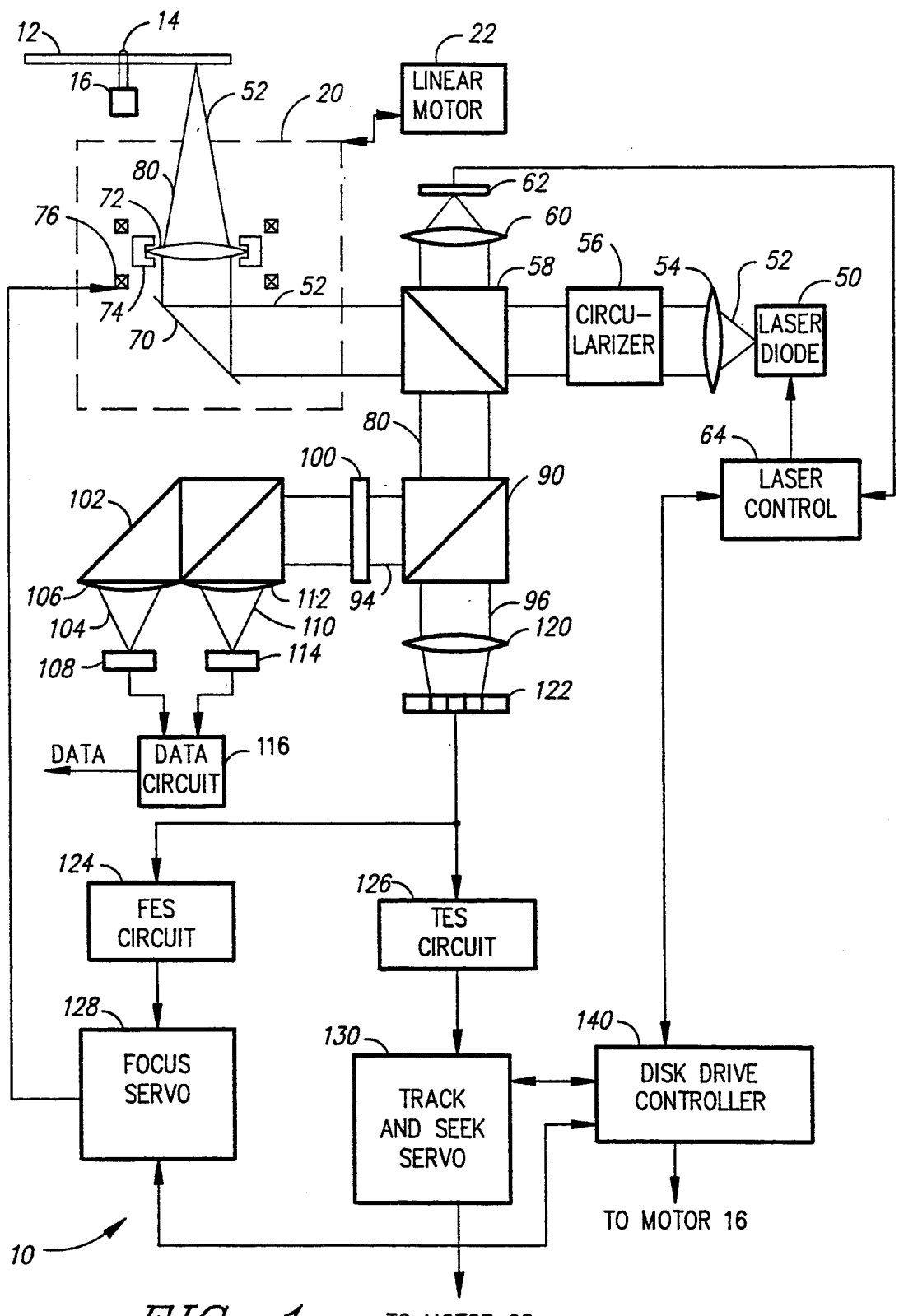
FIG. 1 is a schematic diagram of an optical disk drive system of the present invention.

FIG. 1 is a schematic diagram of an optical data storage system of the present invention and is designated by the general reference number 10. System 10 includes an optical data storage medium 12. Medium 12 is preferably a magneto-optic disk. Medium 12 is mounted on a spindle 14 which is attached to a spindle motor 16. Spindle motor 16 rotates the spindle 14 and medium 12.

An optical head 20 is positioned below medium 12. Head 20 is moved in a radial direction relative to disk 12 by a linear motor 22.

A laser 50 produces a polarized light beam 52. Laser 50 is preferably a gallium-aluminum-arsenide laser diode which generates light at approximately 780 nm in wavelength. Alternatively, laser 50 could be an aluminum-gallium-indium phosphate laser diode which generates light at approximately 670 nm in wavelength. Light beam 52 is collimated by a lens 54 and circularized by a circularizer 56. Circularizer 56 is preferably a prism.

Beam 52 passes to a beamsplitter 58. A portion of beam 52 is reflected toward a lens 60. Lens 60 focuses the light to a power monitor optical detector 62. Detector 62 is connected to a laser control 64. Detector 62 provides laser control 64 with a power monitor signal which is used to adjust the power of laser 50 as appropriate.

The remaining portion of beam 52 passes through beamsplitter 58 to a mirror 70. Mirror 70 reflects the light toward a focussing lens 72. Lens 72 focuses beam 52 onto the optical media 12. Lens 72 is mounted in a lens holder 74. Holder 74 may be moved relative to the disk by an actuator motor 76. Mirror 70, lens 72, holder 74 and motor 76 are preferably located in the optical head 20.

A light beam 80 is reflected from the medium 12, passes through lens 72 and is reflected by mirror 70. A portion of the light beam 80 is then reflected by beamsplitter 58 to a beamsplitter 90. Beamsplitter 90 divides the beam 80 into a data beam 94 and a servo began 96.

Data beam 94 passes through a half waveplate 100 to a polarizing beamsplitter 102. Beamsplitter 102 divides beam 94 into two orthogonal polarizations components. A first polarization component beam 104 is focussed by a lens 106 to a data detector 108. A second polarization component 110 is focussed by a lens 112 to a data optical detector 114. A data circuit 116 is connected to detectors 108 and 114 and generates a data signal representative of the data encoded on medium 12.

Servo beam 96 is focussed by a lens 120 onto a segmented optical detector 122. A focus error signal (FES) circuit 124 and a tracking error signal (TES) circuit 126 are connected to detector 122. A focus servo 128, as is known in the art, is connected to circuit 124 and motor 76. Servo 128 receives a FES from circuit 124 and controls motor 76 to adjust the position of lens 72 as appropriate. A track and seek servo 130, as is known in the art, is connected to circuit 126 and motor 22. Servo 130 receives the TES from circuit 126 and causes motor 22 to adjust the position of head 20 as appropriate. A disk drive controller 140, as is known in the art, provides overall control for servo 128 and 130, as well as laser control 164 and motor 16.

Figure 2:
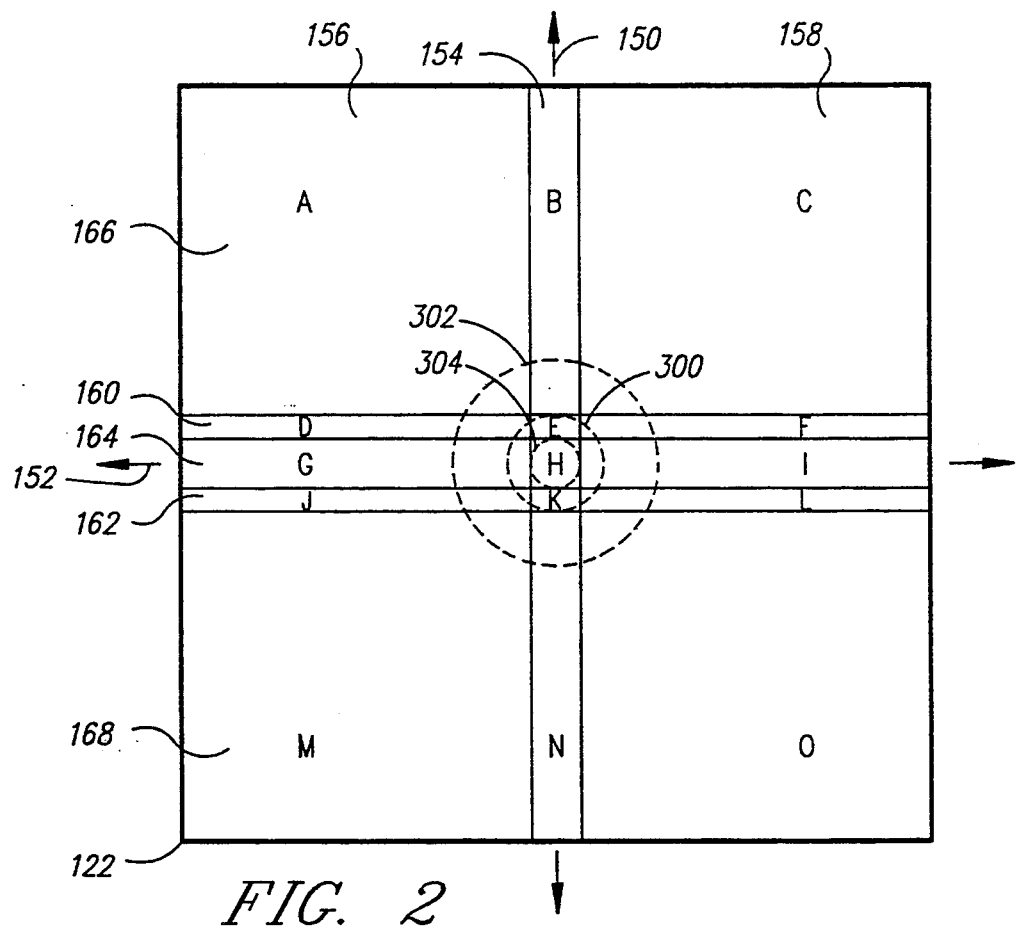
FIG. 2 is a top view of an optical detector of FIG. 1.

FIG. 2 is a top view of detector 122. Detector 122 has a central vertical axis 150 and a central horizontal axis 152. Detector 122 is oriented such that axis 152 is approximately parallel to a line tangent to the tracking grooves of the medium 12. Detector 122 is divided into fifteen segments 152A, B, C, D, E, F, G, H, I, J, K, L, M, N and O. A vertical strip 154 is centrally located along axis 150 and comprises segments B, E, H, K and N. A vertical section 156 comprises segments A, D, G, J and M, and a vertical section 158 comprises segments C, F, I, L and O.

A pair of horizontal striped sections 160 and 162 are located symmetrically on either side of axis 152. Stripe 160 comprises sections D, E and F and stripe 162 comprises sections J, K and L. A horizontal section 164 lies centrally along axis 152 between stripes 160 and 162. Stripe 164 comprises sections G, H and I. A pair of horizontal sections 166 and 168 lie above and below sections 160 and 162, respectively. Section 166 comprises A, B and C, and section 168 comprises M, N and O.

Figure 3:
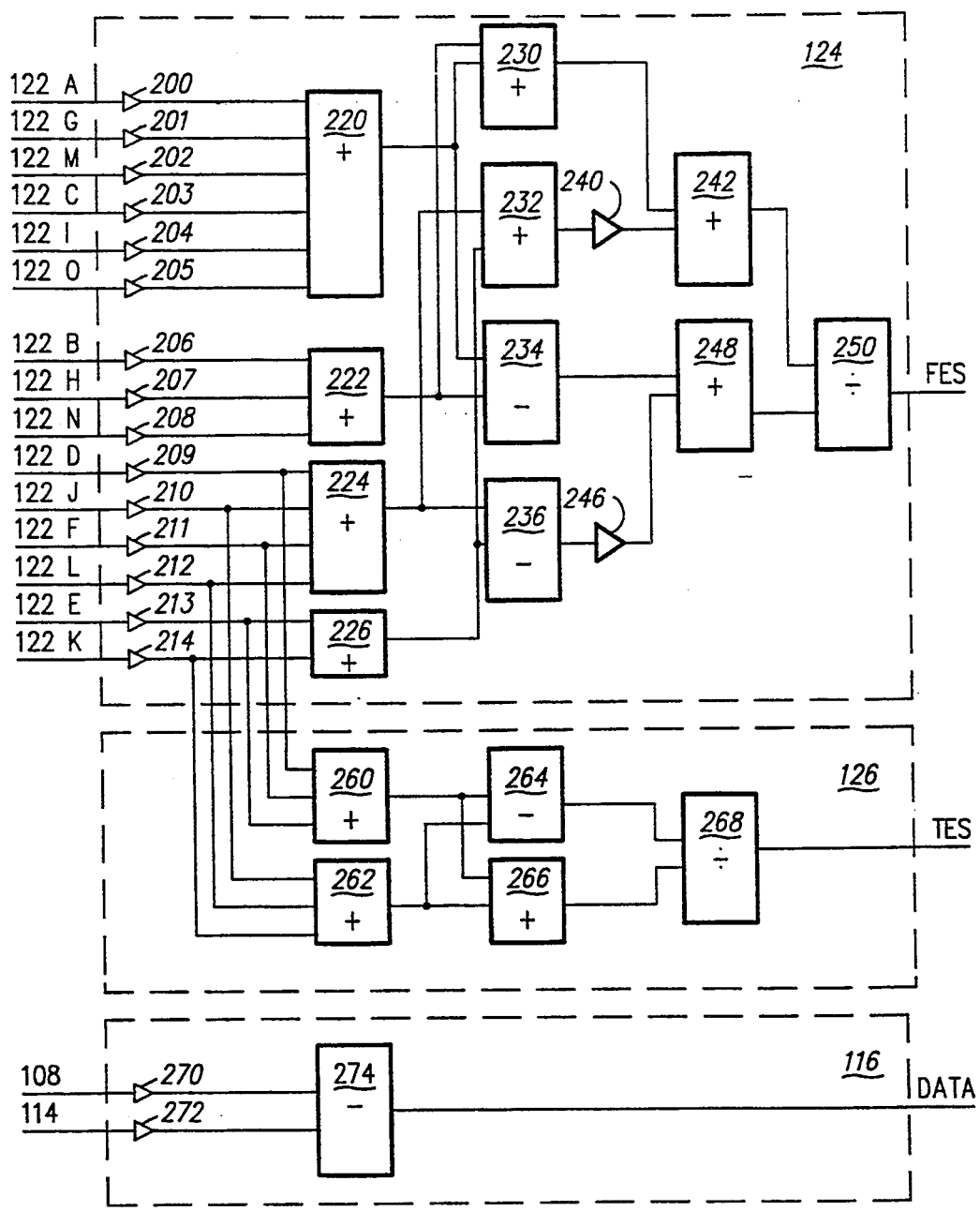
FIG. 3 is a circuit diagram of the FES, TES and data circuitry of FIG. 1.

FIG. 3 shows a circuit diagram of the FES circuit 124, TES circuit 126, and data circuit 116. Circuit 124 comprises a plurality of amplifiers 200–214, 240 and 246, summing circuits 220, 222, 224, 226, 230, 232, 242 and 248, differential circuits 234 and 236, and a division circuit 250.

The circuit 124 outputs the FES. The resulting FES is equal to $(((A+G+C+M+I+O)-(B+H+N))+Z((D+J+F+L)-(E+K)))/((A+G+C+M+I+O+B+H+N)+Z(D+J+F+L+E+K))$ where A–O correspond to the amplitude of the signals from the corresponding detector segments after amplification by amplifiers 209–214 and where Z is equal to the amplification factor of amplifiers 240 and 246.

Circuit 126 comprises summing circuits 260, 262 and 266, differential circuits 264 and division circuit 268. A TES is produced equal to $((D+E+F)-(J+K+L))/(D+E+F+J+K+L)$ where D, E, F, J, K and L correspond to the amplitudes of the signal's output from the corresponding detector segments after amplification by amplifiers 209–214.

Circuit 116 comprises a pair of amplifiers 270 and 272 and a differential amplifier 274. Amplifiers 270 and 272 are connected to detectors 108 and 114, respectively. Circuit 116 outputs a data signal which is the difference in signal amplitude between detectors 108 and 114.

The operation of system 10 may now be understood. See FIG. 1. When it is desired to access data from the disk 12, controller 140 causes laser control 64 to energize laser 50 to the desired power level. Beam 52 is focussed on disk 12. The magneto-optic media 12, which is typically an amorphous ferromagnetic rare earth transition metal film, has data encoded as magnetic domains having a net up or down magnetization. When beam 52 falls upon these magnetic domains the plane of polarization of the reflected light is rotated one way or the other depending upon the net magnetization of the magnetic domains. This is known as the Kerr effect. This change in polarization is then detected as the difference in the amount of light striking detectors 108 and 114.

A portion of the reflected beam 80 (servo beam 96) falls on detector 122 and is used for generating servo signals. See FIG. 2. If beam 52 is in focus and on track on disk 12, then beam 96 will fall as a cross-section 300 on detector 122. Circuit 124 will output a zero FES. If beam 52 is out of focus one way or the other, it will fall as a cross-section 302 or 304 on detector 122. Circuit 124 will output a positive or negative FES and servo 128 will cause motor 76 to move lens 72 until focus is again achieved. Cross-sections 300, 302 and 304 represent the location of the full width at half the maximum (FWHM) for the servo beam 96.

If beam 52 is directly on the data track, then as shown for cross-section 300, beam 96 will lie equally on sections 160 and 162, a circuit 126 will output zero TES. If beam 52 moves off the data track, it will fall partially on one of the tracking grooves located on either side of the data track. The beam 52 will be diffracted up or down such that more light falls upon section 160 and less on section 162, or vice versa. Circuit 126 will output a positive or negative TES and servo 130 will cause motor 22 to move head 20 until beam 52 is again on track.

When it is desired to access a different data track, controller 140 causes servo 130 and motor 22 to move head 20 to seek another track. As beam 52 is moved radially along the disk 12, it will encounter the grooves between each track. As described above, the beam 52 experiences diffraction at these grooves. The intensity distribution will no longer be symmetrical. In prior art systems this causes the FES to misregister and the system could go out of focus. However, the FES of the present invention is not affected by the aberrations of track crossings and will maintain focus throughout the track seek operation. Another advantage of the present invention is that the effects of spherical aberration, astigmatism and coma, present in the incident wavefront on the disk as a result of misalignment or component tolerances are greatly reduced. This improves both the TES as well as the FES.

In a preferred embodiment, the beam cross-section 300 will have a diameter of approximately 160 $\mu$m at the full width at half the maximum (FWHM). Section 154 has a width of approximately 76microns. Sections 160 and 162 each have a width of approximately 55 $\mu$m and section 164 has a width of approximately 60 $\mu$m. Sections 160 and 162 each have a width corresponding to approximately one third of the diameter distance of cross-section 300. The centers of sections 160 and 162 are each positioned at approximately one third to one half of a diameter (of cross-section 300) vertical distance from the center of cross-section 300. The detector 122 is made using standard photolithographic techniques as are known in the art. An inactive dead space of approximately 10 $\mu$m distance separates all of the active detector regions.

FIGS. 4A, B, C and D show graphs of signal amplitude (in arbitrary units) versus focus position (in units of wavelength:$\lambda$) for the FES when the beam is on land (on track), the FES when the beam is on a groove (off track) and the crosstalk for the system of the present invention. A disk medium having trapezoidal shaped tracking grooves, as is known in the art, was assumed to be used. The crosstalk is the amount of TES which occurs in the FES when the beam is on the land. The zero focus position is the lens position where the beam is in focus on the disk. FIG. 4A shows the system with amplification by the amplifiers 240 and 246 of a factor 1 ($Z=1$). This is in effect no differential amplification at all. Please note the large crosstalk and nonlinearity of the FES. FIGS. 4B, C and D show the system with amplifications of $Z=2$, 4 and 6, respectively. Note that for FIG. 4D, the amplification produces very little servo crosstalk and the FES are approximately linear.

FIGS. 5A, B, C and D show graphs similar to those of FIG. 4, except that a medium with V-shaped tracking grooves was assumed to be used. Note that in FIG. 5D, where $Z=6$, the crosstalk is essentially zero and very good linearity and coincidence of FES results.

Figure 6:
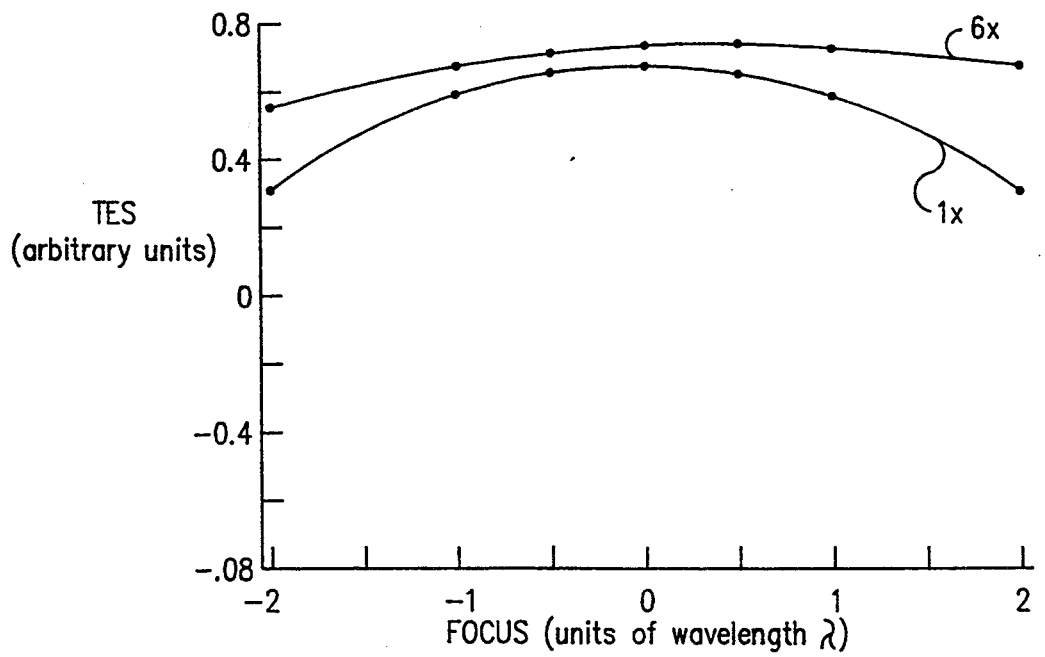
FIG. 6 is a graph of TES versus focus position.

FIG. 6 shows a graph of TES amplitude (in arbitrary units) versus focus position (in units of wavelength $\lambda$) for the trapezoidal shaped groove disk as used in the present invention with amplifications of Z equal one and six. The beam was assumed to be on the grooves (off track). Note that the TES for the amplification of six is relatively flat, indicating that it is very little affected by the focus position. FIGS. 4, 5 and 6 were made using a computer simulation of the diffraction of the optical system.

Figure 7:
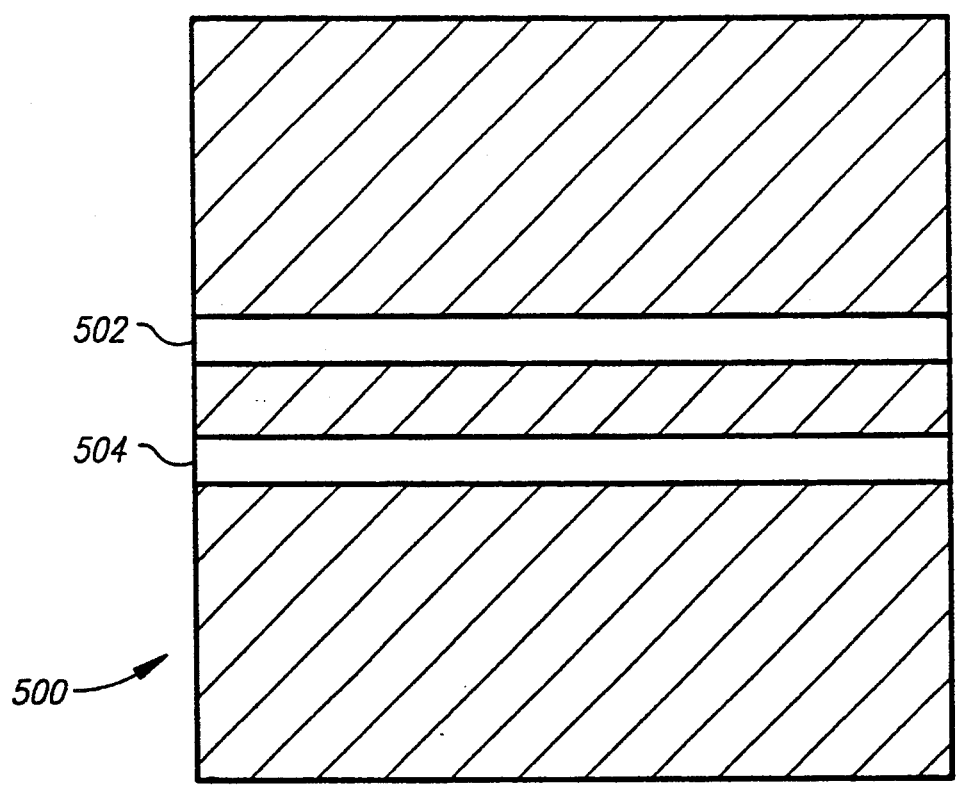
FIG. 7 is a top view of an optical filter for use in an alternative embodiment of the present invention.

FIG. 7 shows a top view of an optical filter which may be used as an alternative embodiment of the present invention and is designated by the general reference number 500. Filter 500 is approximately the same dimensions as detector 122. Filter 500 is segmented by two horizontal stripes 502 and 504 which correspond in dimension and location to the sections 160 and 162 of detector 122. The filter may be made by vacuum deposition of thin metal films using standard photolithographic techniques. Stripes 502 and 504 are more light transmissive than the other sections of the filter. In the preferred embodiment, six times more light passes through sections 502 and 504 than other sections of the filter.

In operation, filter 500 is positioned over detector 122 such that stripes 502 and 504 overlay sections 160 and 162 of detector 122. The rest of system 10 remains the same except that the amplifiers 240 and 246 of circuit 124 are omitted. Circuit 236 is then connected directly to circuit 248 and circuit 232 is then connected directly to circuit 242. Sections 502 and 504 will allow more of the light beam 96 to pass through to detector 122, than at the other portions of the filter.

In effect, the amount of light received at detector sections other than sections 160 and 162 is decreased relative to the amount of light reaching sections 160 and 162. The resulting FES will be relatively free of effects from aberrations contributed by the groove structure and also those present in the incident beam on the disk due to misalignment of the optical components.

Figure 8:
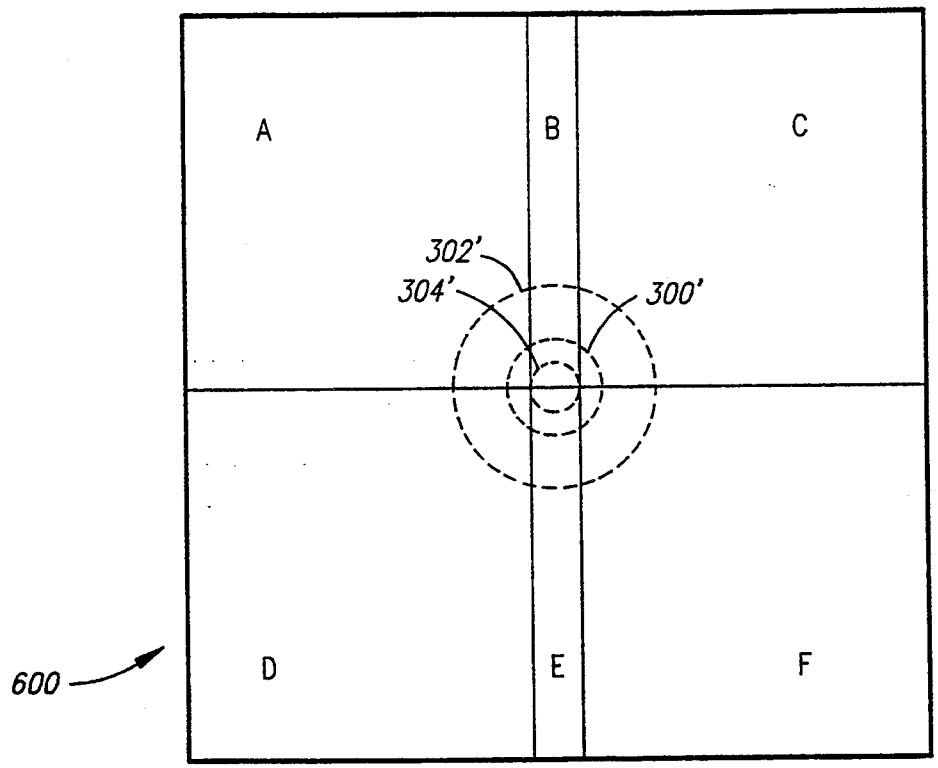
FIG. 8 is a top view of an optical detector.

The filter 500 may also be used with standard spot size measuring servo systems as are known in the art. FIG. 8 shows a top view of a spot size measuring optical detector and is designated by the general reference number 600. Detector 600 is divided into six sections A, B, C, D, E and F.

Figure 9:
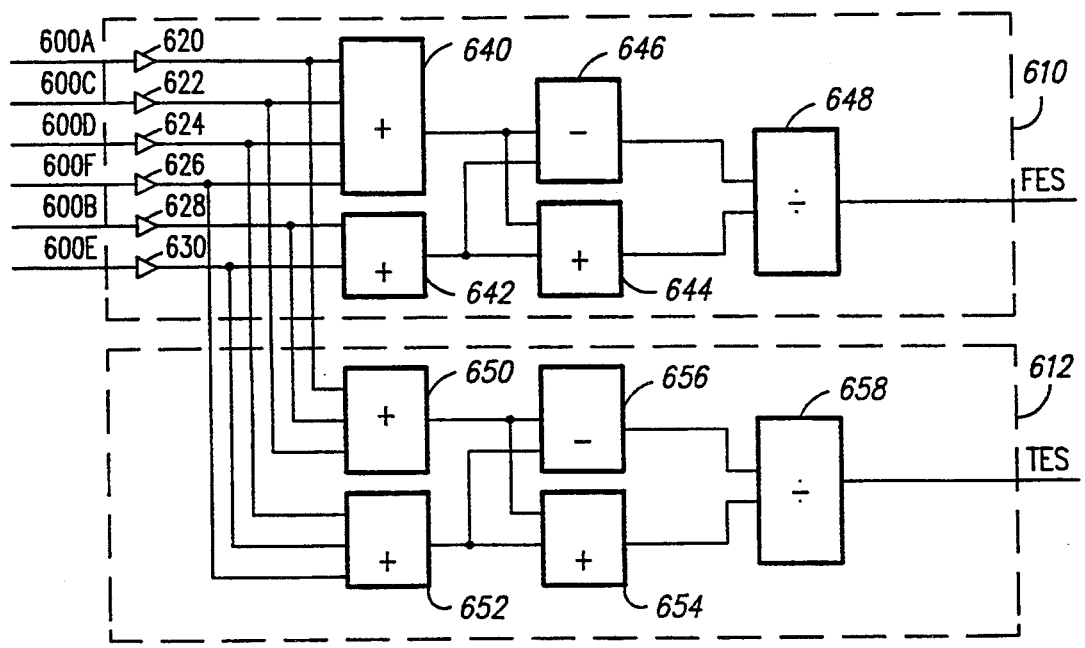
FIG. 9 is a circuit diagram of the FES and TES circuitry used for the detector of FIG. 8.

FIG. 9 shows a circuit diagram of a FES circuit 610 and a TES circuit 612 for use with the optical detector 600. Circuit 610 comprises a plurality of amplifiers 620–630, a plurality of summing amplifiers 640, 642 and 644, a differential amplifier 646 and a division circuit 648. FES circuit 610 implements the equation FES is $=[[A+C+D+F]-[B+E]]/[A+B+C+D+E+F]$.

Circuit 612 comprises a plurality of summing amplifier 650, 652, 654, a differential amplifier 656 and a divisional circuit 658. TES circuit 612 implements the equation TES =[[A+B+C]−[D+E+F]]/[A+B+C+-D+E+F].

In operation, detector 600 is substituted for detector 122 of system 10 of FIG. 1. The FES circuit 610 and TES circuit 612 are substituted for FES circuit 124 and TES circuit 126, respectively. The filter 500 is then placed over detector 600 such that the stripes 502 and 504 of filter 500 lie on either side of the boundary line between sections ABC and sections DEF of detector 600. The result is that the light reaching the detector 600 is differentially filtered and the resulting FES will be relatively free of aberrations. The advantage of the embodiment using filter 500 is that it may be easily installed over existing spot size measuring optical detectors.

While the preferred embodiments of the present invention have been illustrated in detail, it should be apparent that the modifications and adaptations to those embodiments may occur to one skilled in the art without departing from the scope of the present invention as set forth in the following claims.

What is claimed is:

1. An optical data storage system comprising:
   a radiation means for producing a first radiation beam;
   an optical data storage medium having data tracks;
   a radiation transmission means for transmitting the first radiation beam from the radiation source to a first spot on a data track of the medium;
   a radiation reception means for receiving a second radiation beam from the first spot on the medium, the radiation reception means including a segmented optical detector, the detector being segmented into a plurality of first stripe sections and non-first stripe sections, the first stripe sections having a longitudinal dimension substantially perpendicular to a direction in which the beam at the detector is displaced when the beam at the storage medium moves off of the data track; and
   an output signal generator for generating an output signal connected to the segmented optical detector, the signals from the first stripe sections differentially adjusted relative to the signals from the non-first stripe sections, such that the resulting output signal is substantially independent of the wavefront aberrations in the second radiation beam.

2. The system of claim 1, wherein the output signal is indicative of a diameter of the radiation beam falling upon the detector.

3. The system of claim 1, wherein the differential adjustment is achieved by signal amplification means.

4. The system of claim 1, wherein the differential adjustment is achieved by an optical filter.

5. An optical data storage system comprising:
   a light source for producing a first light beam;
   a means for receiving an optical data storage medium having data tracks;
   an adjustable focussing means for focussing the first light beam to a first spot on a data track of the medium;
   a movement means for moving the first light beam across the optical medium;
   an optical reception means for receiving a second light beam from the medium, the optical reception means including a segmented optical detector, the detector being segmented into a plurality of first stripe sections and non-first stripe sections, the first stripe sections having a longitudinal dimension substantially perpendicular to a direction in which the beam at the detector is displaced when the beam at the storage medium moves off of the data track
   a tracking error signal means connected to the optical detector for generating a tracking error signal; and
   a focus error signal means connected to the optical detector for generating a focus error signal, the focus error signal means including means for differentially amplifying the output signals from the first strip sections relative to the output signals from the non-first stripe sections such that the focus error signal is substantially independent of changes in the tracking error signal.

6. The system of claim 5, wherein the first stripe sections are comprised of a pair of first stripe sections which segment the detector in a first direction.

7. The system of claim 6, wherein the detector is segmented in a second direction by a second stripe section.

8. The system of claim 6, wherein the widths of each of the first stripe sections are approximately equal to one third of the full width at half the maximum intensity of a focussed beam incident on the detector.

9. The system of claim 8, wherein the centers of the first stripe sections are each located a distance D from the center of a beam incident on the detector, where D is substantially equal to $\frac{1}{3}$-$\frac{1}{2}$ of the full width at half the maximum intensity of a focussed beam incident on the detector.

10. The system of claim 1, wherein the output signal from the pair of first stripe sections are amplified a greater amount than the output signals from the non-first stripe sections.

11. The system of claim 10, wherein the amplification factor is substantially equal to 6.

12. An optical data storage system comprising:
   a light source for producing a first light beam;
   a means for receiving an optical data storage medium having data tracks;
   an adjustable focussing means for focussing a first light beam to a first spot on a data track of the medium;
   a movement means for moving the first light beam across the optical medium;
   an optical reception means for receiving a second light beam from the medium, the optical reception means including a segmented optical detector having a segmented optical filter, the optical filter being segmented into a plurality of first stripe sections and non-first stripe section, the first stripe sections having a longitudinal dimension substantially perpendicular to a direction in which the beam at the detector is displaced when the beam at the storage medium moves off of the data track, the optical filter for differentially adjusting the amount of light passing through the first stripe sections relative to the non-first stripe sections;
   a tracking error signal means connected to the optical detector for generating a tracking error signal; and
   a focus error signal means connected to the optical detector for generating a focus error signal, the focus error signal being substantially independent of changes in the tracking error signal.

13. The system of claim 12, wherein the detector is segmented in a first direction by a pair of first stripe detector sections.

14. The system of claim 13, wherein the detector is segmented in a second direction by a second stripe section.

15. The system of claim 13, wherein the widths of each of the first stripe sections are substantially equal to one third of the full width at half the maximum intensity of a focussed beam incident on the detector.

16. The system of claim 15, wherein the centers of the first stripe sections are each located a distance D from the center of a beam incident on the detector, where D is substantially equally to $\frac{1}{3}$-$\frac{1}{2}$ of the full width at half the maximum intensity of a focussed beam incident on the detector.

17. The system of claim 13, wherein the first stripe filters sections correspond to a pair of first stripe detector sections of the detector, and the first stripe filter sections allow more light to pass than in other portions of the optical filter.

18. The system of claim 17, wherein the optical transmission of light through the pair of first stripe filter sections is substantially equal to six times greater than that through the other sections of the optical filter.

19. A method for an optical data storage system comprising the steps of:
generating a first radiation beam;
directing the first radiation beam to a first spot on a data track of an optical data storage medium;
receiving a reflected radiation beam from the optical data storage medium at a segmented radiation detector, the detector being segmented into a plurality of first stripe sections and non-first stripe sections, the first stripe sections having a longitudinal dimension substantially perpendicular to a direction in which the beam at the detector is displaced when the beam at the storage medium moves off of the data track;
processing the signals from each of the segments of the radiation detector to produce an output signal; and
differentially amplifying the signals from the first stripe sections relative to the signals from the non-first stripe sections such that the resulting output signals are approximately independent of wavefront aberrations in the reflected radiation beam.

20. A method for an optical data storage system comprising the steps of:
generating a first radiation beam;
directing the first radiation beam to a first spot on a data track of an optical data storage medium;
passing a reflected radiation beam through an optical filter, the optical filter being segmented into a plurality of first stripe filter sections and non-first stripe filter sections, the first stripe filter sections having a longitudinal dimension substantially perpendicular to a direction in which the beam at the detector is displaced when the beam at the storage medium moves off of the data track, the optical filter for differentially adjusting the amount of light passing through the first stripe sections relative to the non-first stripe sections;
receiving the reflected radiation beam at a segmented radiation detector; and
processing the signals from each of the segments of the radiation detector to produce an output signal.

21. An optical data storage system comprising:
a light source for producing a first light beam;
a means for receiving an optical data storage medium having data tracks;
an adjustable focussing means for focussing the first light beam to a first spot on a data track of the medium;
a movement means for moving the first light beam relative to the medium;
an optical reception means for receiving a second light beam from the medium, the optical reception means including a segmented optical detector, the segments being divided by a plurality of boundary lines, a first pair of boundary lines dividing the detector in a first direction, thereby forming a right zone of segments, a first middle zone of segments, and a left zone of segments, a second and third pair of boundary lines dividing the detector in a second direction substantially perpendicular to the first direction, thereby forming an upper zone of segments, an upper stripe zone of segments, a second middle zone of segments, a lower stripe zone of segments, and a lower zone of segments;
a tracking error signal means connected to the optical detector for generating a tracking error signal; and
a focus error signal means connected to the optical detector for generating a focus error signal, the focus error signal means including an amplifier for amplifying the signals from the upper stripe and lower stripe zones relative to the upper, second middle and lower zones, and including means connected to the amplifier for comparing the sum of the signals from the left and fight zones with the sum of the signals from the first middle zone.

22. The system of claim 21, wherein the widths of each of the upper stripe and lower stripe, zones are approximately equal to $\frac{1}{3}$ of the full width at half the maximum intensity of a focussed beam incident on the detector.

23. The system of claim 21 wherein the centers of the upper stripe and lower stripe zones are each located a distance D from the center of a beam incident on the detector, where D is substantially equal to $\frac{1}{3}$-$\frac{1}{2}$ of the full width at half the maximum intensity of a focussed beam incident on the detector.

24. The system of claim 21, wherein the amplification factor of the amplifier is substantially equal to 6.

25. An optical data storage system comprising:
a light source for producing a first light beam:
a means for receiving an optical data storage medium having data tracks;
an adjustable focussing means for focussing the first light beam to a first spot on a data track of the medium;
a movement means for moving the first light beam relative to the medium;
an optical reception means for receiving a second light beam from the medium, the optical reception means including a segmented optical detector and an optical filter overlying the detector, the segments of the detector being divided by a plurality of boundary lines, a first pair of boundary lines dividing the detector in a first direction, thereby forming a right zone of segments, a first middle zone of segments, and a left zone of segments, a second and third pair of boundary lines dividing the detector in a second direction substantially perpendicular to the first direction, thereby forming an upper zone of segments, an upper stripe zone of segments, a second middle zone of segments, a lower stripe zone of segments and a lower zone of segments, the optical filter having a first filter zone overlying the upper, second middle and lower zones of the detector and having a second filter zone overlying the upper stripe and lower stripe zones of the detector, the second filter zone allowing more light to pass than the first filter zone;

a tracking error signal means connected to the optical detector for generating a tracking error signal;

a focus error signal means connected to the optical detector for generating a focus error signal, a focus error signal means including a means for comparing the sum of the signals from the left and right zones with the sum of the signals from the first middle zone.

26. The system of claim 25, wherein the widths of each of the upper stripe and lower stripe zones are substantially equal to ⅓ of the full width at half the maximum intensity of a focussed beam incident on the detector.

27. The system of claim 25, wherein the centers of the upper stripe and lower stripe zones are each located a distance D from the center of a beam incident on the detector where D is substantially equal to ⅓-½ of the full width at half maximum intensity of a focus beam incident on the detector.

28. The system of claim 25, wherein the optical transmission of light through the second filter zone is substantially equal to six times greater than that through the first filter zone.

29. An optical data storage system comprising:
a light source for producing a first light beam;
a means for receiving an optical data storage medium having data tracks;
an adjustable focussing means for focussing the first light beam to a first spot on a data track of the medium;
a movement means for moving the first light beam relative to the medium;
an optical reception means for receiving a second light beam from the medium, the optical reception means including a segmented optical detector and an optical filter overlying the optical detector, the segments of the optical detector being divided by plurality of boundary lines, a first pair of boundary lines dividing the detector in a first direction, thereby forming a right zone of segments, a detector middle zone of segments and a left zone of segments, the optical filter having a first and second pair of filter boundary lines dividing the filter in a second direction substantially perpendicular to the first direction, thereby forming an upper filter zone, an upper stripe filter zone, a middle filter zone, a lower stripe filter zone, and a lower filter zone, the upper stripe filter and lower stripe filter zones allowing more light to pass than the upper, middle and lower filter zones;

a tracking error signal means connected to the optical detector for generating a tracking error signal; and a focus error signal means connected to the optical detector for generating a focus error signal, the focus error signal means including means for comparing the sum of the signals from the left and right zones of the detector with the sum of the signals from the middle detector zone of the detector.

30. The system of claim 29, wherein the widths of each of the upper stripe filter and lower stripe filter zones are substantially equally to ⅓ of the full width at half the maximum intensity of a focussed beam incident on the detector.

31. The system of claim 29, wherein the centers of the upper stripe filter and lower stripe filter zones are each located a distance D from the center of beam incident on the detector, where D is substantially equal to ⅓-½ of the full width at half the maximum intensity of a focussed beam incident on the detector.

32. The system of claim 29, wherein the optical transmission of light through the upper stripe filter and lower stripe filter zones is substantially equally to six times greater than that through the other zones of the optical filter.

* * * * *

UNITED STATES PATENT AND TRADEMARK OFFICE
CERTIFICATE OF CORRECTION

PATENT NO. : 5,396,478
DATED : March 7, 1995
INVENTOR(S) : Matthias Krantz

It is certified that error appears in the above-indentified patent and that said Letters Patent is hereby corrected as shown below:

Column 8, line 35 delete "claim 1," and add --claim 6,--

Signed and Sealed this

Twenty-ninth Day of August, 1995

Attest:

BRUCE LEHMAN

*Attesting Officer*  *Commissioner of Patents and Trademarks*